United States Patent [19]
Connelly

[11] 3,759,140
[45] Sept. 18, 1973

[54] INSIDE FLASH BEAD TRIMMER APPARATUS FOR WELDED METAL PIPE HAVING ALTERNATELY REMOTELY POSITIONABLE FLASH BEAD CUTTERS

[75] Inventor: Eugene B. Connelly, Churchill Borough, Pa.

[73] Assignee: United States Steel Corporation, Pittsburgh, Pa.

[22] Filed: Mar. 29, 1972

[21] Appl. No.: 239,147

[52] U.S. Cl. .................... 90/24 B, 228/19, 83/184, 83/564
[51] Int. Cl. ............................................. B23d 1/02
[58] Field of Search ...................... 90/24 B, 24 R; 29/33 D; 228/19; 83/184, 564

[56] References Cited
UNITED STATES PATENTS

| 3,177,776 | 4/1965 | Marhanka | 90/24 B |
| 3,349,212 | 10/1967 | Morris et al. | 228/19 X |
| 3,352,208 | 11/1967 | Thomas et al. | 90/24 B |

FOREIGN PATENTS OR APPLICATIONS 1,920,870  11/1970  Germany ............................ 90/24 B Primary Examiner—Andrew R. Juhasz
Assistant Examiner—Z. R. Bilinsky
Attorney—Donald S. Ferito et al.

[57] ABSTRACT

Apparatus includes a frame rigidly supported on the inner end of a boom extending into a welded tube or pipe, the pipe being longitudinally movable relative to the boom; an elongated rocker body having an inner flash bead cutter thereon adjacent each end thereof pivotally mounted intermediate its ends in the frame; a cam mounted for longitudinal movement in the frame subjacent and relative to the rocker body for alternately raising the ends of the rocker body so as to place one of the cutters into operating position when the other cutter becomes worn; and remotely operable means mounted on the frame and connected with the cam for moving it relative to the rocker body.

6 Claims, 6 Drawing Figures

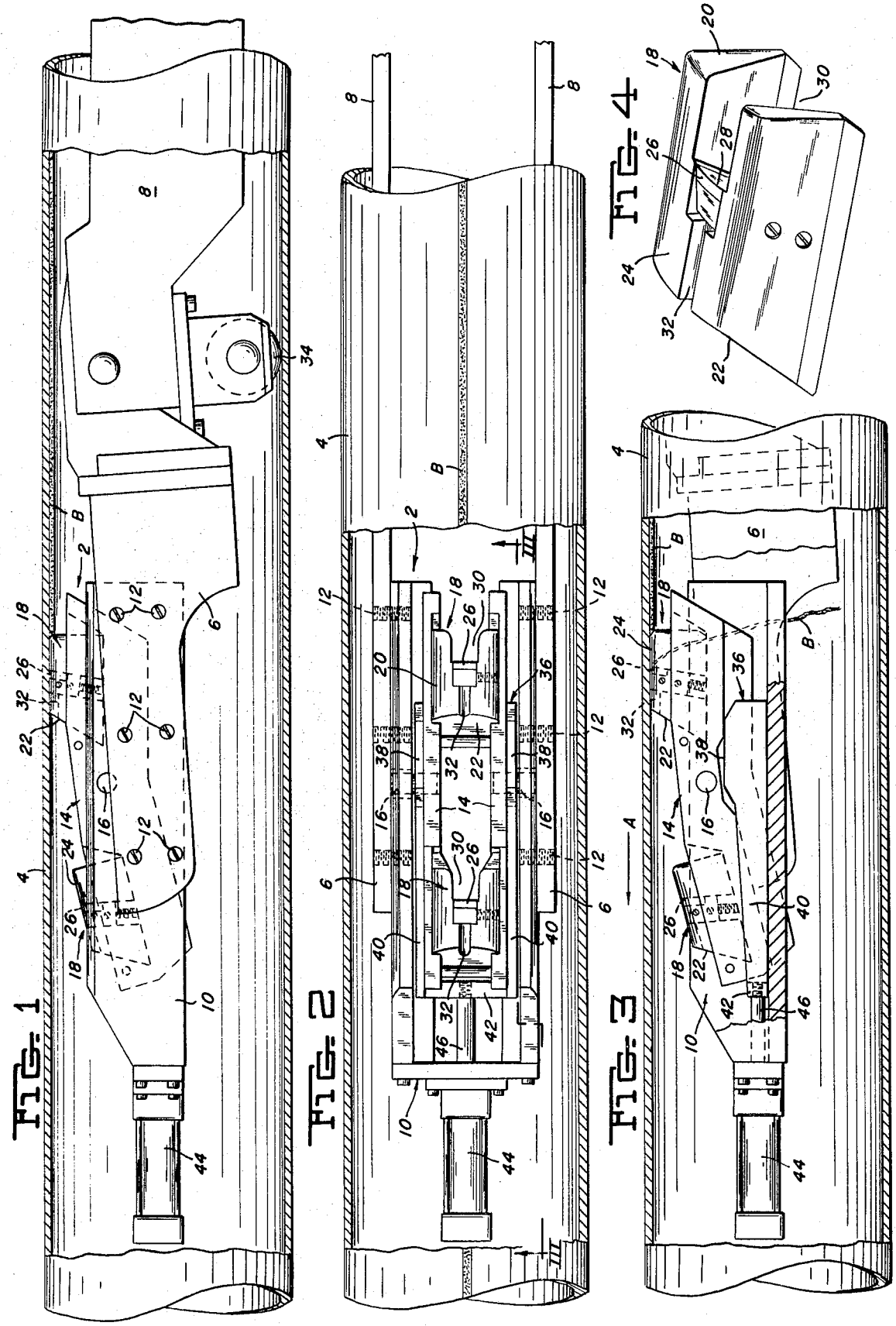

INSIDE FLASH BEAD TRIMMER APPARATUS FOR WELDED METAL PIPE HAVING ALTERNATELY REMOTELY POSITIONABLE FLASH BEAD CUTTERS

The present invention relates generally to apparatus for producing continuously longitudinally welded tubes or pipes and more particularly to an apparatus for trimming the inner flash bead or burr from the inner surface of welded tubular products during the manufacture thereof.

When producing welded pipe, it is usually desirable to remove the excess weld bead or burr from the inner surface of the pipe after the weld has been made. This is done to produce a pipe or tube having a smooth inner surface with no inwardly projecting protrusions in the weld area. The excess bead or burr is normally cut off by some form of cutting tool mounted on the end of a boom. The boom is moved through the pipe or the pipe is moved over the boom, whichever lends itself best to the particular application. After a given number of welded pipe lengths have been deburred, the cutting tool can be inspected for wear and replaced as needed.

When producing pipe on a continuous weld mill, however, the continuous pipe is not cut into shorter individual lengths until quite late in the manufacturing process after welding for obvious economic reasons. In the production of pipe on a continuous weld mill, continuous strip or skelp is continuously fed into the mill which shapes and welds the strip to form pipe of an infinite length. Since it is usual practice to remove the inner flash bead continuously after welding during this process and since the deburring tool is necessarily located inside the continuous infinite length of welded pipe, there is no opportunity to inspect the deburring tool for wear or change before it fails. Weld bead inspection devices which are conventional components of continuous welded pipe mills are depended upon to signal that the deburring tool is not performing its function. Prior to my invention when this situation became apparent, the entire mill operation had to be immediately suspended, an opening cut in the pipe to provide access to the deburring tool, and the tool removed and replaced by another. Each time a worn deburring tool had to be replaced production ceased and consequent economic loss incurred.

It is, accordingly, the primary object of my invention to provide an improved inner flash bead or burr trimming apparatus which can be remotely operated to substitute an alternate new deburring tool for a worn one without the necessity of suspending operations of the continuous pipe welding mill so as to reduce mill downtime due to replacing worn deburring tools to at least half of what was necessary heretofore.

It is a more specific object of my invention to provide an improved apparatus for trimming the inner flash bead or burr from the surface of a welded tubular product during the manufacture thereof which includes a frame rigidly supported on the inner end of a boom extending into a welded tube, the tube being longitudinally movable relative to the boom; an elongated rocker body having an inner flash bead cutter thereon adjacent each end thereof pivotally mounted intermediate its ends in the frame; a cam mounted for longitudinal movement in the frame subjacent and relative to the rocker body for alternately raising the ends of the rocker body so as to place one of the cutters into operating position when the other cutter becomes worn; and remotely operable means mounted on the frame and connected with the cam for moving the cam relative to the rocker body.

The above and other objects will become more apparent after referring to the following specification and attached drawing, in which:

FIG. 1 is a side elevational view of the apparatus of the invention in operating position in the interior of a welded pipe;

FIG. 2 is a plan view of FIG. 1;

FIG. 3 is a longitudinal sectional view with parts broken away for clarity taken substantially along the line III—III of FIG. 2;

FIG. 4 is a view in perspective of the inner flash bead cutting assembly of the invention;

Figure 5:
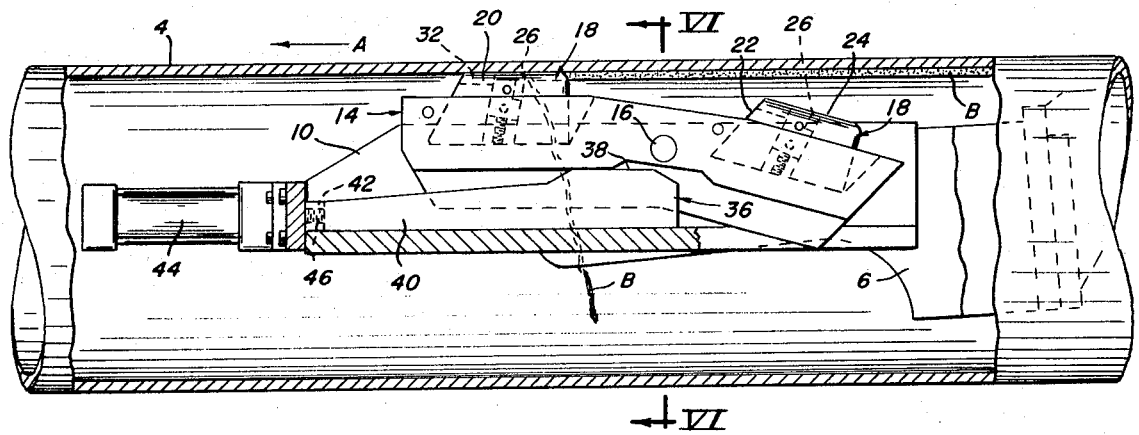
FIG. 5 is a view substantially similar to FIG. 3 but showing the apparatus of the invention in the alternate operating position.

Referring more particularly to the drawing, reference character 2 designates generally the inner flash bead trimming apparatus of the invention positioned in the interior of a pipe or tube 4. The apparatus 2 is completely surrounded and enclosed by the pipe 4. The apparatus 2 is supported on the clevis shaped inner end 6 of a boom 8 which extends into one end of the pipe 4 from an anchor (not shown) which is located a distance away to the right, as viewed in FIGS. 1, 2, 3, and 5, of the bed of the pipe forming machine (not shown). As viewed in FIGS. 1, 2, 3, and 5, the pipe 4 is moving to the left, as indicated by arrow A, propelled by an outside force (not shown).

Figure 6:
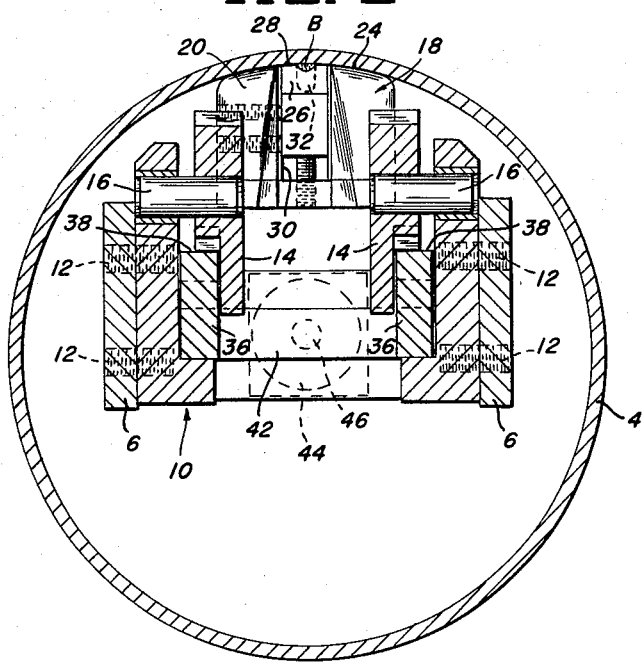
FIG. 6 is an enlarged cross sectional view taken substantially along the line VI—VI of FIG. 5.

The apparatus 2 includes an elongated frame 10 including a pair of opposed spaced lateral members each having a substantially L shape cross section, as best shown in FIGS. 3 and 6, rigidly supported within the clevis end 6 of boom 8 by set screws 12. An elongated rocker body 14 is pivotally mounted intermediate its ends in the frame 10 by a pair of aligned spaced pivot pins 16. Flash bead cutting assemblies 18 are mounted in the rocker body one adjacent each end thereof.

Each of the cutting assemblies 18 includes a tool holder or shoe 20 having one end 22 formed in wedge shape and an upper surface 24 formed with a rounded contour which conforms with the inner curvature of the pipe 4. A cutting blade 26 having a curved cutting end 28 on its upper surface is rigidly disposed in the shoe 20 with its curved cutting end forming a continuation of and being flush with the rounded contour of the upper surface 24 of the shoe 20. The shoe 20 is formed with a vertical slot 30 therethrough adjacent the leading edge of the cutting end of the blade 26 for receiving the flash bead B of the pipe 4 as it is cut away from the inner surface of the pipe, as best shown in FIGS. 3 and 5. A longitudinal slot 32 is formed in the upper surface of the shoe 20 extending normal to the cutting surface of the blade 26 for receiving the flash bead B when the cutter blade 26 becomes worn and is not cutting the bead B away from the inner wall of the moving pipe 4.

The shoes 20 are received in suitable openings in the rocker body 14 which are shaped on the bottom thereof adjacent the side in the direction the pipe 4 is traveling to mate with the wedge-shaped ends 22 of the shoes 20 so that the shoes are constantly urged into rigid placement by pressure of the cutting action taking place between the cutter blade 26 and the bead B.

A roller 34 is rotatably mounted on and supports the boom 8 on the side thereof remote from the bead B, as best shown In FIG. 1.

A cam assembly 36, consisting of a pair of spaced aligned cam surfaces 38 having parallel extensions 40 of reduced cross section projecting therefrom in the direction of travel of the pipe 4 and a cross beam 42 attached to and connecting the ends of the extensions remote from the cam surfaces, is mounted in the frame 10 subjacent the rocker body 14 for longitudinal movement relative to the rocker body. Movement of the cam surfaces 38 in one direction or the other causes the rocker body to pivot to raise one of its ends to place the cutting assembly on the raised end into bead trimming position, as best shown in FIGS. 3 and 5.

Longitudinal movement of the cam assembly 36 is effected by a fluid pressure cylinder 44 attached to one end of the frame 10 with its piston rod 46 connected with the cross beam 42 of the cam assembly 36. The cylinder 44 is a two-way cylinder and is provided with suitable supply and exhaust lines (not shown) which are controlled by valves (not shown) at a remote location. Thus, the cylinder 44 may be remotely controlled to project or retract its piston rod 46 to move the cam assembly which in turn pivots the rocker body 14 to the position shown in FIG. 3 or to the position shown in FIG. 5. For example, the piston rod 46 is projected to raise the cutting assembly 18 on the right end of the rocker body 14, as viewed in FIG. 3, into operating position as shown. When the cutter blade of that cutting assembly becomes worn, the uncut flash bead B will travel through the longitudinal slot 32 and not harm the rounded contour of the shoe 20. The worn condition of the right blade 26 will almost immediately be detected by the automatic weld bead inspection devices at which time the cylinder 44 will be actuated to retract the piston rod 46. This will cause the cam assembly 36 to move to the left as viewed in FIG. 5 and cause the cutting assembly on the left end of the rocker body 14 to move into operating position and the cutting assembly on the right end of the rocker body to move downwardly out of operating position. Subsequently, when the cutter blade 26 of the left cutting assembly becomes worn, the operation of the mill is stopped, an opening is cut into the pipe and both cutter blades 26 are replaced.

While I have shown but one embodiment of my invention, other adaptations and modifications may be made without departing from the scope of the following claims.

I claim:

1. Apparatus for trimming a flash bead on the inner surface of a longitudinally welded metal tube which comprises a rigid cantilever support extending longitudinally into said tube from outside one end thereof, an elongated rocker body pivotally mounted intermediate its ends on the inner end of said cantilever support so as to permit relative longitudinal movement between said rocker body and said tube, inner flash bead cutters rigidly mounted one adjacent each end of said rocker body adapted to alternately engage and trim said inner flash bead, a cam longitudinally slidable on said support subjacent said rocker body, said cam being adapted to be moved longitudinally relative to said rocker body and engage the underside thereof selectively on opposite sides of the pivot point of said rocker body to thereby raise said inner flash bead cutters alternately toward and from said inner flash bead, and remotely controlled means for moving said cam.

2. Apparatus for trimming an inner flash bead on the inner surface of a longitudinally welded metal tube which comprises a support boom having a clevis formed at one end adapted to be rigidly disposed with its clevis end extending longitudinally into said tube from one end thereof, a frame rigidly mounted in said clevis end, an elongated rocker body pivotally monted intermediate its ends in said frame so as to permit relative longitudinal movement between said rocker body and said tube, flash bead cutter assemblies mounted one adjacent each end of said rocker body each adapted to selectively engage and trim the flash bead on the inner surface of said tube, a cam mounted for longitudinal movement in said frame subjacent said rocker body, said cam being adapted to be moved longitudinally relative to said rocker body to alternately engage the bottom of said rocker body on opposite sides of its pivot connection with said frame to thereby alternately lift said flash bead cutter assemblies into trimming engagement with said flash bead on the inner surface of said tube, and remotely controlled means attached to said frame and connected with said cam for moving the latter longitudinally relative to said rocker body.

3. Apparatus as defined by claim 2 in which said means for moving said cam includes a fluid pressure cylinder having a piston rod projecting therefrom, said cylinder being mounted on one end of said frame and said piston rod being connected with said cam.

4. Apparatus as defined by claim 2 in which a roller is rotatably mounted on said boom adjacent said clevis end thereof for engaging the inner surface of said tube substantially opposite said inner flash bead.

5. Apparatus as defined by claim 2 in which each of said inner flash bead cutter assemblies comprises a tool holder block being formed with a rounded contour on its upper surface substantially conforming to the curvature of the inner surface of said tube, a cutter blade rigidly mounted in said tool holder block, said cutter blade having a curved cutting end and being disposed in said holder block with its curved cutting end mating with the rounded contour of the upper surface of the holder block, said block having a slot therethrough adjacent the leading edge of the cutting end of the cutter blade for receiving the inner flash bead after it has been cut away from the inner surface of the tube.

6. Apparatus as defined by claim 5 in which said tool holder block is formed with a notch in its upper surface normal to the trailing edge of the cutting end of said cutter blade for receiving said inner flash bead after the cutting end of said cutter blade becomes worn to a point where it does not engage said inner flash bead.

* * * * *